(12) United States Patent
Suginohara (10) Patent No.: US 10,185,132 B2
(45) Date of Patent: Jan. 22, 2019

(54) FLOATING IMAGE DISPLAY DEVICE

(71) Applicant: MITSUBISHI ELECTRIC CORPORATION, Tokyo (JP)

(72) Inventor: Hidetsugu Suginohara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/419,428

(22) Filed: Jan. 30, 2017

(65) Prior Publication Data

US 2017/0235114 A1 Aug. 17, 2017

(30) Foreign Application Priority Data

Feb. 15, 2016 (JP) .................................. 2016-025635

(51) Int. Cl.
*G02B 27/10* (2006.01)
*G02B 17/06* (2006.01)
(Continued)

(52) U.S. Cl.
CPC ............. *G02B 17/06* (2013.01); *G02B 27/00* (2013.01); *G02B 27/10* (2013.01);
(Continued)

(58) Field of Classification Search
CPC .... G02B 17/06; G02B 17/00; G02B 27/1066; G02B 27/10; G02B 27/106
(Continued)

(56) References Cited

U.S. PATENT DOCUMENTS 4,200,366 A * 4/1980 Freeman .............. G03B 21/115
353/78
5,189,452 A * 2/1993 Hodson .................... G02B 5/12
353/122
(Continued)

FOREIGN PATENT DOCUMENTS

EP 1 739 472 A1 1/2007
JP 2000-249975 A 9/2000
(Continued)

OTHER PUBLICATIONS

"Mitsubishi Electric Develops "Aerial Display" that Project Large Images Midair", for Immediate Release, No. 3001, Mitsubishi Electric Corporation Public Relations Division, Feb. 17, 2016, 2 pgs.

*Primary Examiner* — William R Alexander
(74) *Attorney, Agent, or Firm* — Birch, Stewart, Kolasch & Birch, LLP (57) ABSTRACT

A floating image display device includes an image display for displaying a display image; a beam splitter for splitting light emitted from the display image into first light and second light; and a curved retroreflective sheet for retroreflecting the first light to display a floating image based on the display image at a space in air so that the floating image is seen from a predetermined reference position, wherein the image display, the beam splitter and the curved retroreflective sheet are arranged so that the first light traveling from the beam splitter to the curved retroreflective sheet is retroreflected and specularly reflected, a retroreflected light based on the first light travels from the curved retroreflective sheet via the beam splitter to the reference area and a specularly-reflected light based on the first light travels from the curved retroreflective sheet toward outside of the reference area.

5 Claims, 6 Drawing Sheets (51) Int. Cl.
  *G02B 27/00* (2006.01)
  *G02B 27/22* (2018.01)
(52) U.S. Cl.
  CPC ..... *G02B 27/1066* (2013.01); *G02B 27/2292* (2013.01); *G02B 27/106* (2013.01)
(58) Field of Classification Search
  USPC ........................................................ 359/631
  See application file for complete search history.

(56) References Cited

U.S. PATENT DOCUMENTS

| | | | | |
|---|---|---|---|---|
| 5,629,806 A * | 5/1997 | Fergason | ............. | G02B 27/026 359/630 |
| 6,008,945 A * | 12/1999 | Fergason | ........... | G02B 27/0172 359/630 |
| 6,147,805 A * | 11/2000 | Fergason | ........... | G02B 27/0172 359/630 |
| 6,473,115 B1 * | 10/2002 | Harman | ............. | G02B 27/2235 348/51 |
| 6,550,918 B1 * | 4/2003 | Agostinelli | .......... | G02B 26/101 353/10 |
| 2002/0186348 A1 * | 12/2002 | Covannon | ............ | G02B 27/225 351/240 |
| 2003/0035085 A1 * | 2/2003 | Westort | ............. | G02B 17/0621 353/10 |
| 2003/0206344 A1 * | 11/2003 | Agostinelli | ........ | G02B 27/2235 359/464 |
| 2004/0212882 A1 * | 10/2004 | Liang | ................. | G02B 27/2235 359/462 |
| 2010/0177402 A1 | 7/2010 | Maekawa | | |
| 2015/0248014 A1 * | 9/2015 | Powell | ................. | G02B 3/0006 349/10 |
| 2016/0005219 A1 * | 1/2016 | Powell | .................. | G06F 3/0425 345/426 |
| 2017/0261729 A1 * | 9/2017 | Powell | .................... | G02B 5/13 |
| 2018/0003981 A1 * | 1/2018 | Urey | ................. | G02B 27/0172 |

FOREIGN PATENT DOCUMENTS

| | | |
|---|---|---|
| JP | 2005-316436 A | 11/2005 |
| JP | 2009-25776 A | 2/2009 |
| JP | 2012-163702 A | 8/2012 |
| JP | 5177483 B2 | 4/2013 |

* cited by examiner

FLOATING IMAGE DISPLAY DEVICE

BACKGROUND OF THE INVENTION

1. Field of the Invention

The present invention relates to a floating image display device for displaying a floating image in the air where there are no display elements.

2. Description of the Related Art

There has been proposed a technology for projecting a display image displayed on a flat panel display or the like onto a space in the air where there are no display elements. For example, Patent Document 1 discloses a technology that employs a half mirror and a retroreflective sheet, and thereby forms a floating image based on the display image in a space at a position plane-symmetrical with respect to the half mirror to display the floating image as a real image in the air.

Patent Document 1 is Japanese Patent Application Publication No. 2009-25776.

By using the aforementioned technology, a floating image can be displayed in the air where there are no display elements. However, there are cases where the viewer seeing the floating image sees a reduced image of the floating image overlapping with the floating image and thereby the visibility of the floating image deteriorates.

SUMMARY OF THE INVENTION

An object of the present invention is to provide a floating image display device capable of improving the visibility of the floating image.

To resolve the above problem, a floating image display device according to the present invention includes an image display for displaying a display image; a beam splitter for splitting light emitted from the display image into first light and second light; and a curved retroreflective sheet for retroreflecting the first light to display a floating image based on the display image at a space in air so that the floating image is seen from a predetermined reference position. The image display, the beam splitter and the curved retroreflective sheet are arranged so that the first light traveling from the beam splitter to the curved retroreflective sheet is retroreflected and specularly reflected, a retroreflected light based on the first light travels from the curved retroreflective sheet via the beam splitter to the reference area and a specularly-reflected light based on the first light travels from the curved retroreflective sheet toward outside of the reference area.

According to the present invention, the reduced image of the floating image is prevented from being seen, the viewer is enabled to exclusively see the floating image, and the visibility of the floating image can be improved.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Figure 1:
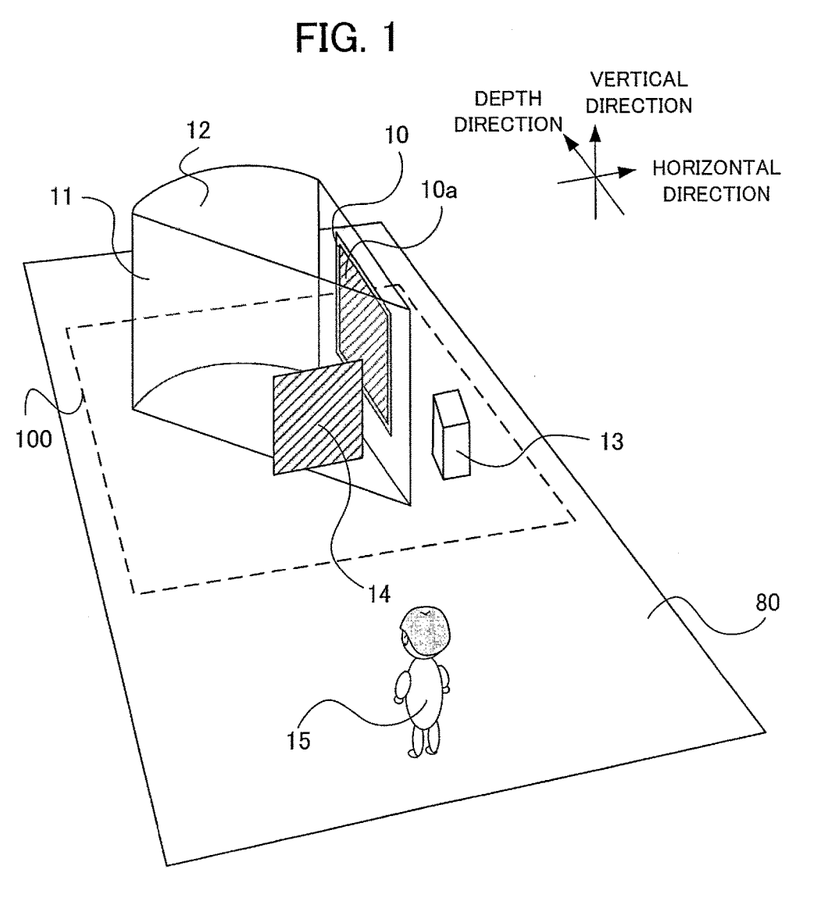
FIG. 1 is a bird's-eye view showing a schematic configuration of a floating image display device according to a first embodiment of the present invention.

FIG. 1 is a bird's-eye view showing a schematic configuration of a floating image display device 100 according to a first embodiment of the present invention. Referring to FIG. 1, the floating image display device 100 includes an image display 10 having a display surface 10a, a beam splitter 11, a curved retroreflective sheet 12, and an image control unit 13. In the example shown in FIG. 1, the image display 10, the beam splitter 11 and the curved retroreflective sheet 12 are arranged so that the display surface 10a of the image display 10, surfaces (a light reflection/incidence surface 11a and a light exit surface 11b in FIG. 2 which will be described later) of the beam splitter 11 and a curved surface of the curved retroreflective sheet 12 on the retroreflecting side are substantially orthogonal to a floor surface 80 serving as a reference plane. The image display 10 receives an image signal from the image control unit 13 and displays a display image based on the image signal on the display surface 10a. The display image displayed on the display surface 10a of the image display 10 is projected onto a space in the air as a floating image 14, i.e., a floating image 14 based on the display image is displayed in the air, by a floating image formation optical system made up of the beam splitter 11 and the curved retroreflective sheet 12. Usually, a viewer 15 sees the floating image 14 from a position (i.e., a predetermined reference position) right in front of the floating image 14.

Figure 2:
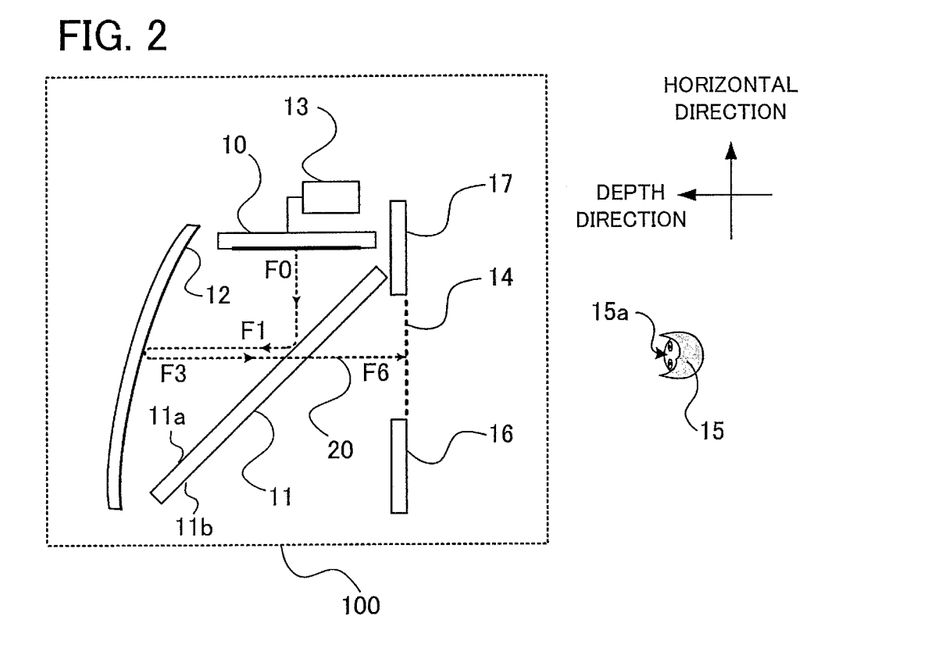
FIG. 2 is a top view showing a schematic configuration of the floating image display device according to the first embodiment.

FIG. 2 is a top view showing a schematic configuration of the floating image display device 100 according to the first embodiment. Since FIG. 2 shows the same configuration as that shown in FIG. 1, reference characters identical with those shown in FIG. 1 are assigned to the components shown in FIG. 2. FIG. 2 illustrates the positional relationship among the components of the floating image display device 100. Further, FIG. 8 is an enlarged top view showing a configuration of the optical system of the floating image display device 100 shown in FIG. 2 and its principal optical paths 20.

Figure 8:
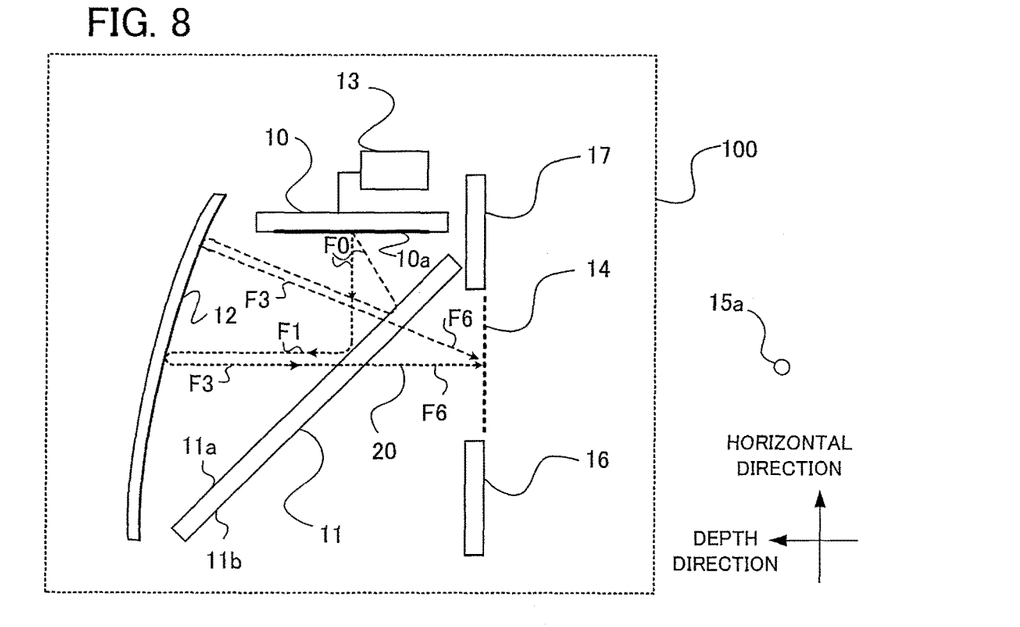
FIG. 8 is an enlarged top view showing a configuration of an optical system of the floating image display device shown in FIG. 2 and its principal optical paths.

As shown in FIG. 2 and FIG. 8, the floating image display device 100 includes an image display 10 for displaying a display image, the beam splitter 11 for splitting light F0 emitted from the display image displayed on the display surface 10a into first light (e.g., a reflected light component F1) and second light (e.g., a transmitted light component which is not shown in FIG. 2 and FIG. 8), and the curved retroreflective sheet 12 for retroreflecting the first light to display the floating image 14 based on the display image at a space in the air so that the floating image 14 is seen from a predetermined reference position 15a, which is a position including viewer's eyes, for example. The image display 10, the beam splitter 11 and the curved retroreflective sheet 12 are arranged so that the first light (e.g., a reflected light component F1) traveling from the beam splitter 11 to the curved retroreflective sheet is retroreflected and specularly reflected, a retroreflected light (e.g., a retroreflected light component F3) of the first light travels from the curved retroreflective sheet 12 via the beam splitter 11 to the reference position 15a and a specularly-reflected light of the first light travels from the curved retroreflective sheet 12 toward outside of the reference position 15a. In other words, the image display 10, the beam splitter 11 and the curved retroreflective sheet 12 are arranged so that the retroreflected light can travel from the curved retroreflective sheet 12 via the beam splitter 11 toward the reference position 15a and the amount of the specularly-reflected light traveling from the curved retroreflective sheet 12 via the beam splitter 11 toward the reference position 15a is less than that of the conventional device (which has a flat retroreflective sheet and is not inclined) or is so small as to be negligible.

In the following description, details of the configuration of the floating image display device 100 will be described with reference to FIG. 1, FIG. 2 and FIG. 8.

The image display 10 displays a display image on its display surface 10a by using a means for emitting light. The image display 10 is, for example, a liquid crystal display including a liquid crystal layer (e.g., transmissive liquid crystal layer) and a backlight as the means for emitting light. Such a liquid crystal display displays a display image by modulating the intensity of light emitted from the backlight in regard to each pixel by using the liquid crystal layer. From the surface (display surface 10a) of the liquid crystal display, a set of modulated rays of light is emitted as image light. The image display 10 may also be an image display device other than a liquid crystal display. For example, the image display 10 may also be an image display device of the self-luminous type such as a plasma display, an organic EL (ElectroLuminescence) display or an LED (Light—Emitting Diode) display. The image display 10 may also be made up of a screen as the display surface 10a arranged at a position indicated as the display image in FIG. 2 and a projector for projecting an image onto the screen. In this case, light emitted from a light source of the projector is modulated according to the image signal to generate the image light, and a display image can be displayed on the screen by diffused reflection of the image light on the screen. The image display 10 displays the display image according to the image signal outputted from the image control unit 13 on the display surface 10a.

The image control unit 13 outputs the image signal of the display image to be displayed by the image display 10 to the image display 10. The image signal outputted by the image control unit 13 to the image display 10 may either be an image signal inputted from the outside or an image signal stored in a storage unit provided in the image control unit 13.

The beam splitter 11 is an optical element having a feature of splitting incident light into a transmitted light component, which is the second light in the present embodiment and not shown, and a reflected light component, which is the first light in the present embodiment. The beam splitter 11 is a half mirror, for example. The half mirror is a mirror that splits the incident light so that the transmitted light component and the reflected light component are equal (or substantially equal) to each other in the intensity. However, the transmitted light component and the reflected light component do not necessarily have to be equal in the intensity; there can be a difference between the intensity of the transmitted light component and the intensity of the reflected light component. For example, the beam splitter 11 may be formed of a colorless and transparent glass plate or acrylic plate. In the case of the glass plate or acrylic plate, the intensity of the transmitted light component is higher than that of the reflected light component. Compared to the half mirror, the colorless and transparent glass plate or acrylic plate has a characteristic in that the optical absorption rate is low. In the floating image display device 100, the use of an optical element having a low optical absorption rate as the beam splitter 11 has an effect of increasing the luminance of the floating image 14.

The curved retroreflective sheet 12 is formed by bonding a retroreflective sheet, as a sheet-like optical element having a retroreflective function, to a plate curved in an arc-like shape. The retroreflective function means a feature of reflecting the incident light directly towards the direction of incidence. In other words, an optical path in a first direction as the traveling direction of the incident light incident upon the retroreflective sheet and another optical path in a second direction as the traveling direction of the retroreflected light outgoing from the retroreflective sheet are parallel (or substantially parallel) to each other and the first and second directions are opposite to each other. The optical path of the incident light in the first direction and the optical path of the retroreflected light in the second direction are desired to overlap each other. The arc-like shape means that the retroreflecting surface is a concave curved surface. In FIG. 1, the retroreflecting surface is a concave cylindrical surface. The retroreflecting surface of the curved retroreflective sheet 12 is not limited to the arc-like shape and can be modified in various ways. The optical element having the retroreflective function is also referred to as a retroreflector. An optical element having the retroreflective function can be of a bead type made by closely arranging small glass beads all over a mirror surface or of a microprism type made by closely arranging small trigonal pyramids in concave shapes each of whose surfaces is formed as a mirror surface. These are commonly used for traffic signs. Providing the surface of a traffic sign with the retroreflective function has an effect in that the sign illuminated with automobile headlights in the nighttime becomes easily viewable to drivers.

As shown in FIG. 2 and FIG. 8, the beam splitter 11 is arranged in a state of being inclined by 45 degrees (or substantially 45 degrees) with respect to the display surface 10a of the image display 10. Further, the beam splitter 11 is arranged in a state of being inclined by 45 degrees (or substantially 45 degrees) with respect to a direction of a line of vision of the viewer 15 (depth direction). The image display 10 is arranged with its display surface 10a inclined by 90 degrees with respect to the direction of the line of vision of the viewer 15 (depth direction). The curved retroreflective sheet 12 is set on the back side of the beam splitter 11 with its concave surface facing the front of the viewer 15. With such an arrangement shown in FIG. 2, the beam splitter 11 and the curved retroreflective sheet 12 function as the floating image formation optical system in the floating image display device 100. The display image displayed on the display surface 10a of the image display 10 can be projected onto a space in the air as the floating image 14, and the floating image 14 is displayed at a position that is plane-symmetrical with respect to the beam splitter 11.

A principle for projecting the display image displayed on the display surface 10a onto a space in the air as the floating image 14 will be explained below. Out of the light (image light) emitted from the display image displayed on the display surface 10a, the light F0 entering the beam splitter 11 is split into a reflected light component F1 and a transmitted light component (not shown in FIG. 2 and FIG. 8). Of these, the reflected light component F1 is incident upon the curved retroreflective sheet 12, undergoes retroreflection, and thereby returns to the beam splitter 11 as retroreflected light F3. The retroreflected light F3 returning to the beam splitter 11 is further split by the beam splitter 11 into a reflected light component (not shown in FIG. 2 and FIG. 8) and a transmitted light component F6. In FIG. 2 and FIG. 8, optical paths 20 are indicated by broken lines. Incidentally, while the optical paths 20 are drawn so that the reflected light component F at the beam splitter 11 and the retroreflected light F3 do not overlap each other for the sake of easy and clear understanding, the optical paths 20 of the reflected light component F1 and the retroreflected light F3 pass through the same point (or substantially the same point) on the beam splitter 11 in reality. While the optical path 20 in FIG. 2 indicates only an optical path of light traveling from the display surface 10a in a direction orthogonal to the display surface 10a, the display surface 10a emits light in various directions as illustrated in FIG. 8. To trace the optical paths of light entering the beam splitter 11 included in the light emitted in various directions from the display surface 10a, light emitted from a certain point on the display surface 10a converges (reconverges) at a position that is plane-symmetrical with respect to the beam splitter 11. Since the reconverged light appears to be shining at the position of reconvergence to the viewer 15, the image is visually recognized (i.e., can be seen) as the floating image 14 by the viewer 15.

The positional relationship among the image display 10, the beam splitter 11 and the curved retroreflective sheet 12 in FIG. 2 and FIG. 8 is illustrated as a preferred example. The installation positions and angles of the beam splitter 11 and the curved retroreflective sheet 12 with respect to the display surface 10a of the image display 10 can be changed from the example of FIG. 2 and FIG. 8 as long as optical paths for the light of the display image displayed on the display surface 10a to reconverge at the positions plane-symmetrical with respect to the beam splitter 11 can be secured.

Figure 9:
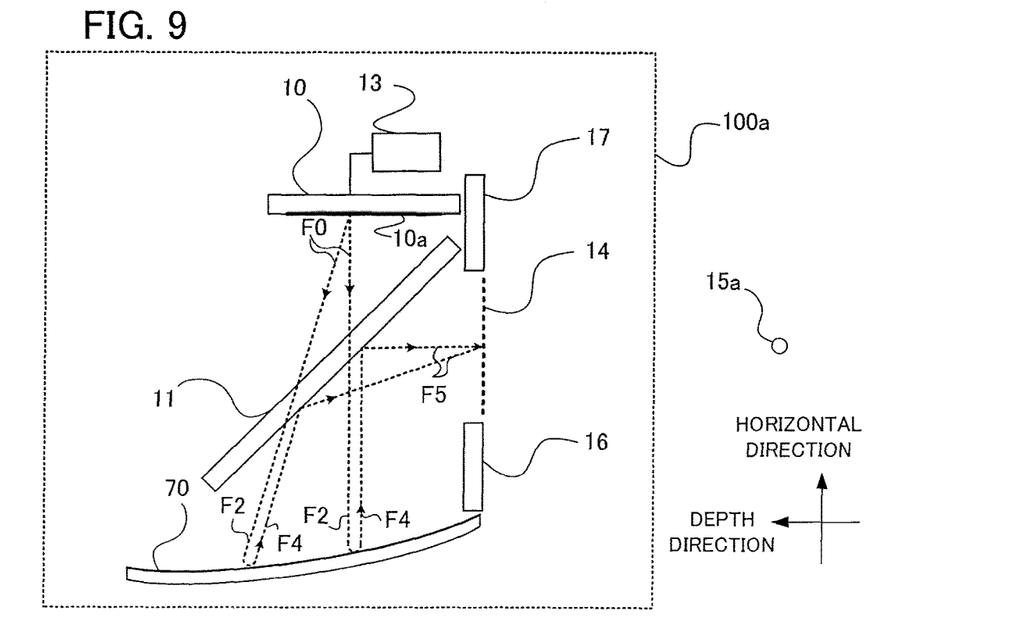
FIG. 9 is an enlarged top view showing another configuration of an optical system of the floating image display device and its principal optical paths.

FIG. 9 is an enlarged top view showing a configuration of the optical system of a floating image display device 100a as a modification of the present embodiment and its principal optical paths. As shown in FIG. 9, a curved retroreflective sheet 70 may be arranged on the left-hand side of the beam splitter 11 as viewed from the viewer 15 to face the image display 10, for example. In this case, out of light F0 emitted from the display image displayed on the display surface 10a, light F2 passing through the beam splitter 11 is retroreflected by the curved retroreflective sheet 70 as retroreflected light F4. Out of the retroreflected light F4 returning to the beam splitter 11, light F5 reflected by the beam splitter 11 forms the floating image 14. Incidentally, while examples of forming the floating image 14 in a space between walls 16 and 17 are shown in FIG. 2, FIG. 8 and FIG. 9, the walls 16 and 17 are not essential components.

In the floating image display devices 100 and 100a employing a floating image formation optical system formed of the beam splitter and the retroreflective sheet, there are cases where a reduced image (reduced image formed by specular reflection based on the display image displayed on the display surface 10a) different from the floating image 14 formed by the retroreflected light (floating image based on the display image displayed on the display surface 10a) is visible to the viewer 15 while overlapping the floating image 14. This is caused by features of the retroreflective sheet, i.e., functions of not only retroreflecting the incident light but also specularly reflecting the incident light. The reduced image visually recognized by the viewer 15 due to the light specularly reflected by the retroreflective sheet will be referred to as a specular reflection image in order to discriminate it from the floating image (retroreflection image). A case where the viewer 15 sees the specular reflection image of the display image displayed on the display surface 10a will, be explained below.

Figure 3:
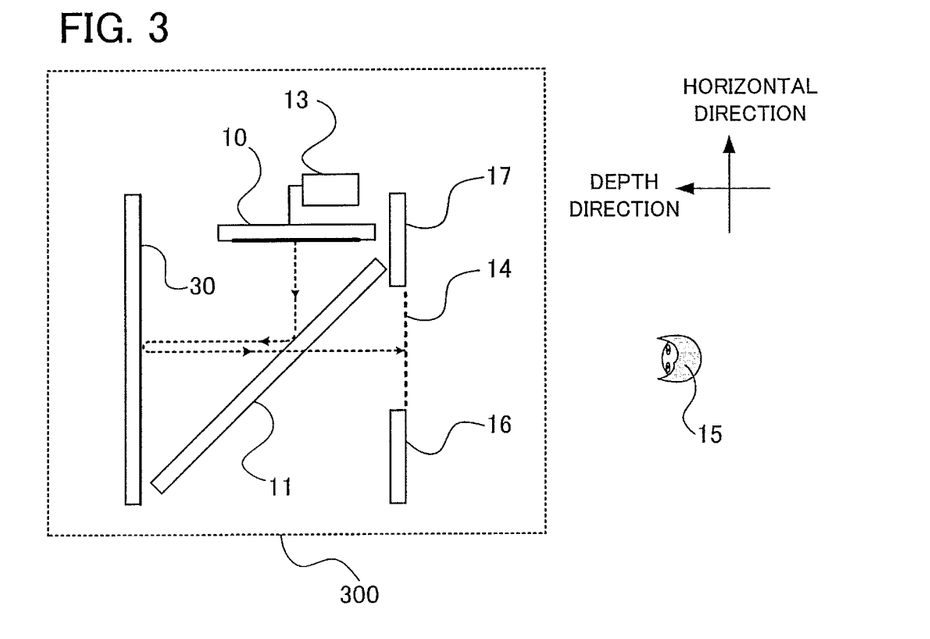
FIG. 3 is a top view showing a schematic configuration of a floating image display device as a comparative example.

FIG. 3 is a top view showing a schematic configuration of a floating image display device 300 as a comparative example employing a beam splitter 11 and a flat retroreflective sheet 30 made by bonding a retroreflective sheet to a flat plate for the floating image formation optical system. Since the floating image display device 300 as the comparative example is the same as the floating image display device 100 according to the present embodiment except for the flat retroreflective sheet 30. As shown in FIG. 3, the flat retroreflective sheet 30 is arranged on the back side of the beam splitter 11 in regard to the depth direction at an inclination angle of 45 degrees with respect to the beam splitter 11 so that its surface faces the viewer 15.

Figure 4:
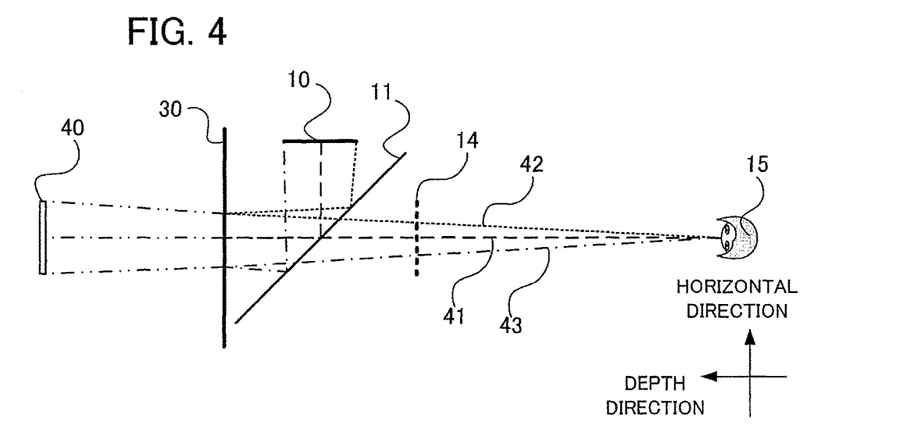
FIG. 4 is a top view showing optical paths in the floating image display device as the comparative example.

FIG. 4 is a top view showing part of optical paths of light specularly reflected by the flat retroreflective sheet 30 and entering the eyes of the viewer 15 right in front of the floating image 14 in the floating image display device 300 as the comparative example. In FIG. 4, the image display 10, the beam splitter 11 and the flat retroreflective sheet 30 are simply drawn as line segments. The optical path 41 indicated by a long dashed line shows a path through which light emitted from the center of the image display 10 is reflected by the beam splitter 11, specularly reflected by the flat retroreflective sheet 30, returns to the beam splitter 11, passes through the beam splitter 11, and reaches the eyes of the viewer 15. The optical path 42 indicated by short dashed lines shows a path through which light emitted from the right end of the image display 10 is reflected by the beam splitter 11, specularly reflected by the flat retroreflective sheet 30, returns to the beam splitter 11, passes through the beam splitter 11, and reaches the eyes of the viewer 15. The optical path 43 indicated by one dot chain lines shows a path through which light emitted from the left end of the image display 10 is reflected by the beam splitter 11, specularly reflected by the flat retroreflective sheet 30, returns to the beam splitter 11, passes through the beam splitter 11, and reaches the eyes of the viewer 15. If part of the image light according to the display image displayed on the display surface 10a, is reflected by the beam splitter 11, is specularly reflected by the flat retroreflective sheet 30, returns to the beam splitter 11 and passes through the beam splitter 11, and reaches the eyes of the viewer 15 as above, the viewer 15 undesirably sees a specular reflection image 40, having the same contents as the display image displayed on the display surface 10a, on the back side of the flat retroreflective sheet 30. Specifically, since the display image displayed on the display surface 10a is inverted when reflected by the beam splitter 11 and is further inverted when specularly reflected by the flat retroreflective sheet 30, the specular reflection image 40 is seen by the viewer 15 as an upright image of the image displayed on the display surface 10a as the result of the two inversions. Since the optical paths 41, 42 and 43 all intersect with the floating image 14, the specular reflection image 40 is visually recognized by the viewer 15 to overlap the floating image 14. Further, due to the anteroposterior relationship between the specular reflection image 40 and the floating image 14 with respect to the viewer 15, the specular reflection image 40 is seen by the viewer 15 as a reduced image of the floating image 14. If the viewer 15 sees a reduced image of the display image displayed on the image display 10 as the specular reflection image 40, a problem arises in that the visibility of the floating image 14 deteriorates.

Figure 5:
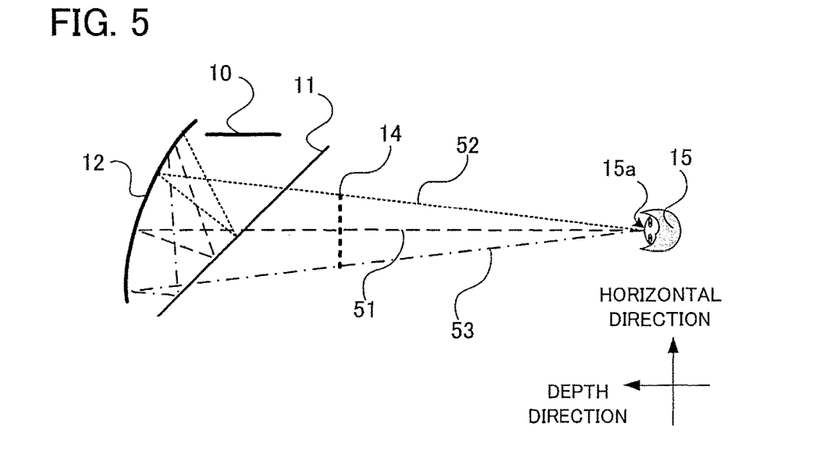
FIG. 5 is a top view showing optical paths in the floating image display device according to the first embodiment.

The floating image display device 100 described in the present embodiment is configured so that the specular reflection image 40 of the display image displayed on the display surface 10a is not seen by the viewer 15, by curving the curved retroreflective sheet 12 in an arc-like shape. FIG. 5 is a top view showing part of optical paths of light specularly reflected by the curved retroreflective sheet 12 and entering the eyes of the viewer 15 (i.e., the reference position 15a) right in front of the floating image 14 in the floating image display device 100. In FIG. 5, the image display 10, the beam splitter 11 and the curved retroreflective sheet 12 are simply drawn as line segments. The optical path 51 indicated by long dashed lines shows a path of light that is reflected by the beam splitter 11, specularly reflected by the curved retroreflective sheet 12, returns to the beam splitter 11, passes through the beam splitter 11, passes through the center of the floating image 14, and reaches the eyes of the viewer 15. The optical path 52 indicated by short dashed lines shows a path of light that is reflected by the beam splitter 11, specularly reflected by the curved retroreflective sheet 12, returns to the beam splitter 11, passes through the beam splitter 11, passes through the right end of the floating image 14, and reaches the eyes of the viewer 15. The optical path 53 indicated by one dot chain lines shows a path of light that is reflected by the beam splitter 11, specularly reflected by the curved retroreflective sheet 12, returns to the beam splitter 11, passes through the beam splitter 11, passes through the left end of the floating image 14, and reaches the eyes of the viewer 15. As shown in FIG. 5, none of the optical paths 51, 52 and 53 intersects with the image display 10. Thus, in the floating image display device 100, the light reflected by the beam splitter 11, specularly reflected by the curved retroreflective sheet 12, returning to the beam splitter 11, passing through the beam splitter 11 and reaching the eyes of the viewer 15 does not include light of the display image displayed on the display surface 10a, and the viewer 15 does not see the display image displayed on the display surface 10a as the specular reflection image. In the case shown in FIG. 5, what is seen as the specular reflection image is a part of the curved retroreflective sheet 12.

Figure 10:
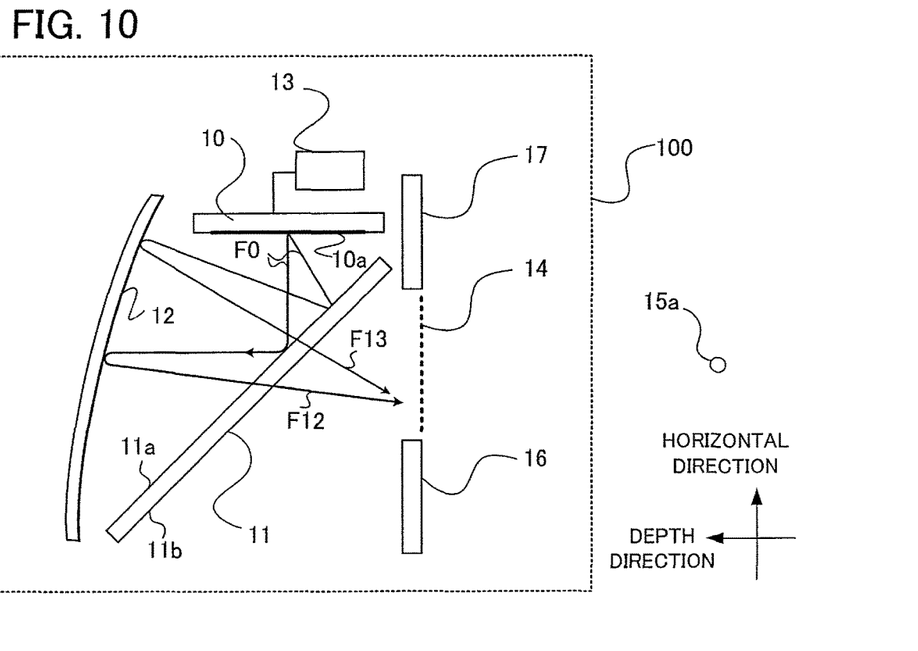
FIG. 10 is a top view showing the configuration of FIG. 8 and its principal optical paths of specularly-reflected light specularly reflected by the curved retroreflective sheet.

FIG. 10 is a top view showing the configuration of FIG. 8 and its principal optical paths of specularly-reflected light specularly reflected by the curved retroreflective sheet. The reason why the specular reflection image of the display image displayed on the display surface 10a is not seen is that the curved retroreflective sheet is curved in an arc-like shape and the traveling direction of the specularly-reflected light F12 and F13 specularly reflected by the surface of the curved retroreflective sheet is set in a direction of separating from the image display 10. By controlling the specular reflection direction as above, the specular reflection image formed by the specular reflection of the display image displayed on the display surface 10a by the surface of the curved retroreflective sheet 12 can be put away to a direction so that the viewer 15 cannot see the specular reflection image.

As for the direction of curving the retroreflective sheet in an arc-like shape, even the horizontal direction alone is sufficiently effective for preventing the viewer 15 from seeing the specular reflection image of the display image displayed on the display surface 10a. It is also possible to prevent the viewer 15 from seeing the specular reflection image of the display image displayed on the display surface 10a by using a spherical retroreflective sheet (i.e., a curved retroreflective sheet having a spherical retroreflective surface) curved not only in the horizontal direction but also in the vertical direction. However, such a spherical retroreflective sheet needs a more complicated production process compared to a retroreflective sheet having an arc-like shape (i.e., a curved retroreflective sheet having a cylindrical retroreflective surface) as viewed from above.

Figure 6:
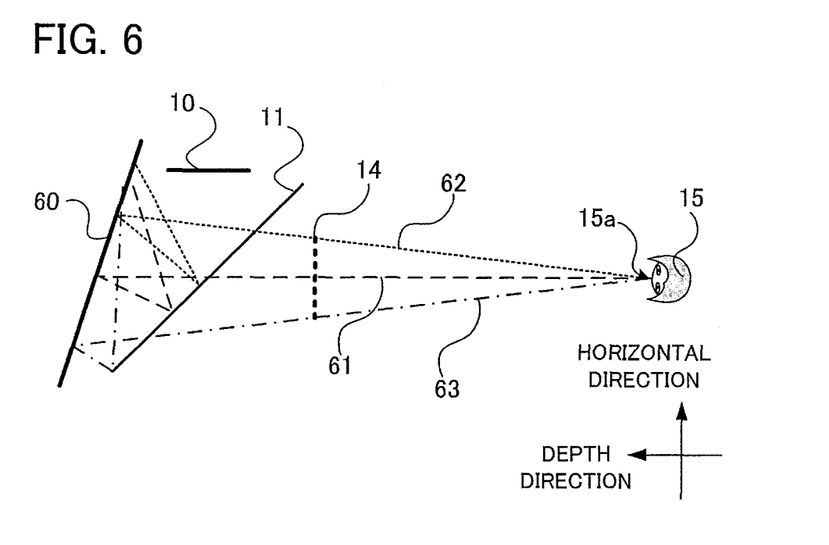
FIG. 6 is a top view showing optical paths in a floating image display device employing an inclined flat retroreflective sheet.

While the description of the present embodiment has been given of cases where the retroreflective sheet is curved in an arc-like shape, other shapes may also be employed for preventing the viewer 15 from seeing the display image displayed on the display surface 10a as the specular reflection image. For example, a retroreflective sheet bonded to a flat plate may be arranged in a state of being inclined by a certain angle with respect to the viewer 15. FIG. 6 is a top view showing part of optical paths of light specularly reflected by an inclined flat retroreflective sheet 60 and entering the eyes of the viewer 15 right in front of the floating image 14. As shown in FIG. 6, none of the optical paths 61, 62 and 63 reflected by the beam splitter 11, specularly reflected by the inclined flat retroreflective sheet 60, returning to the beam splitter 11, passing through the beam splitter 11, crossing the floating image 14 and reaching the eyes of the viewer 15 intersects with the display surface 10a. Thus, the viewer 15 does not see the specular reflection image of the display image displayed on the display surface 10a. As described above, also by inclining the retroreflective sheet, the traveling direction of the light specularly reflected by the surface of the retroreflective sheet can be set in a direction of separating from the image display 10.

Figure 7:
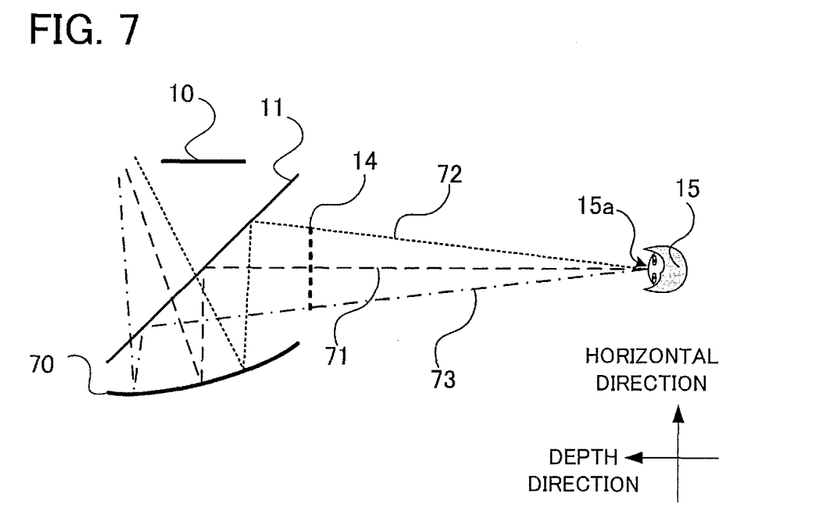
FIG. 7 is a top view showing optical paths in a floating image display device employing a curved retroreflective sheet.

Further, while the description of the present embodiment has been given of cases where a retroreflective sheet curved in an arc-like shape is arranged to face the viewer 15 as shown in FIG. 2, equivalent effect can be obtained also when a retroreflective sheet curved in an arc-like shape is arranged on the left-hand side as viewed from the viewer 15 to face the image display 10 as shown in FIG. 7 and FIG. 9. FIG. 7 is a top view showing part of optical paths of light specularly reflected by a curved retroreflective sheet 70 and entering the eyes of the viewer 15 right in front of the floating image 14 in the case where the curved retroreflective sheet curved in an arc-like shape is arranged on the left-hand side as viewed from the viewer 15 to face the image display 10. In this case, optical paths of light entering the eyes of the viewer 15 as the specular reflection image are optical paths passing through the beam splitter 11, specularly reflected by the curved retroreflective sheet 70, returning to the beam splitter 11, reflected by the beam splitter 11 and reaching the eyes of the viewer 15. In FIG. 7, the optical path 71 indicated by long dashed lines shows an optical path of light passing through the center of the floating image 14 and entering the eyes of the viewer 15 as the specular reflection image. The optical path 72 indicated by short dashed lines shows an optical path of light passing through the right end of the floating image 14 and entering the eyes of the viewer 15 as the specular reflection image. The optical path 73 indicated by one dot chain lines shows an optical path of light passing through the left end of the floating image 14 and entering the eyes of the viewer 15 as the specular reflection image. None of the optical paths 71, 72 and 73 intersects with the display surface 10a of the image display 10, and thus the viewer 15 does not see the specular reflection image of the display image displayed on the display surface 10a.

While the description of the present embodiment has been given of cases where the viewer 15 sees the floating image 14 from a reference position 15a right in front of the floating image 14, there are cases where a viewer at a different position sees the floating image 14. It is the most desirable to control the specular reflection directions on the retroreflective sheet so that the specular reflection image of the display image displayed on the display surface 10a is not seen in a region in which an assumed viewer can be situated.

Description of Reference Characters is as follows:
10: image display, 10a: display surface, 11: beam splitter, 12: curved retroreflective sheet, 13: image control unit, 14: floating image, 15: viewer, 15a: reference position, 20: optical path of retroreflected light, 30: flat retroreflective sheet, 40: specular reflection image, 41-43, 51-53, 61-63, 71-73: optical path of specularly reflected light, 60: inclined flat retroreflective sheet, 70: curved retroreflective sheet, and 100, 100a, 300: floating image display device.

What is claimed is:

1. A floating image display device comprising:
   an image display for displaying a display image;
   a beam splitter for splitting light emitted from the display image into first light and second light; and
   a curved retroreflective sheet for retroreflecting the first light, by reflecting the first light incident on the curved retroreflective sheet directly towards the direction of incidence, such that the display image reconverges at a position that is plane-symmetrical with respect to the beam splitter, the reconverged display image appearing to a viewer as a floating image when viewed from a predetermined reference position, wherein
   the image display, the beam splitter and the curved retroreflective sheet are arranged so that the first light traveling from the beam splitter to the curved retroreflective sheet is retroreflected and specularly reflected,
   the retroreflected light of the first light travels from the curved retroreflective sheet via the beam splitter to the reference position, and
   the specularly-reflected light of the first light travels from the curved retroreflective sheet toward outside of the reference position such that a specular reflection image is not visible to the viewer when viewing the reconverged display image.

2. The floating image display device according to claim 1, wherein the curved retroreflective sheet is curved so as to have a concave retroreflective surface facing the reference position.

3. The floating image display device according to claim 1, wherein the reference position is a position further from the curved retroreflective sheet than the position of the floating image.

4. The floating image display device according to claim 1, wherein:
   the first light is part of the light emitted from the display image,
   the first light is reflected by the beam splitter, thereby travels to the curved retroreflective sheet, and is retroreflected by the curved retroreflective sheet, and
   the retroreflected first light travels through the beam splitter to the reference position.

5. The floating image display device according to claim 1, wherein:
   the first light is part of the light emitted from the display image,
   the first light travels through the beam splitter to the curved retroreflective sheet and is retroreflected by the curved retroreflective sheet, and
   the retroreflected first light travels to the beam splitter, is reflected by the beam splitter, and thereby travels to the reference position.

* * * * *